(12) United States Patent
Dean et al.

(10) Patent No.: US 7,764,435 B2
(45) Date of Patent: Jul. 27, 2010

(54) REDUCED-FOOTPRINT ILLUMINATION SYSTEM USING HIGHLY-EFFICIENT OPTICAL COLLECTION AND REFLECTION SURFACE(S) AND METHOD FOR MANUFACTURING OPTICAL ELEMENTS USED THEREIN

(75) Inventors: David A. Dean, Commerce Township, MI (US); Richard Drumsta, Walled Lake, MI (US); Wieslaw S. Zaydel, Milford, MI (US); Michelle A. Winowski-Zaydel, Milford, MI (US)

(73) Assignee: Pursuit Engineering LLC, Milford, MI (US)

( * ) Notice: Subject to any disclaimer, the term of this patent is extended or adjusted under 35 U.S.C. 154(b) by 210 days.

(21) Appl. No.: 11/675,252

(22) Filed: Feb. 15, 2007

(65) Prior Publication Data

US 2007/0133102 A1     Jun. 14, 2007

Related U.S. Application Data

(63) Continuation-in-part of application No. 10/978,829, filed on Oct. 29, 2004, now Pat. No. 7,186,006.

(60) Provisional application No. 60/522,525, filed on Oct. 8, 2004.

(51) Int. Cl.
    *G02B 27/30*     (2006.01)
(52) U.S. Cl. ...................................... 359/641
(58) Field of Classification Search .................. 359/641
    See application file for complete search history.

(56) References Cited

U.S. PATENT DOCUMENTS 6,824,284 B2 * 11/2004 Chinniah et al. .............. 362/27

* cited by examiner

*Primary Examiner*—Ricky L Mack
*Assistant Examiner*—James C Jones
(74) *Attorney, Agent, or Firm*—David Dort; Dort Patent, P.C.

(57) ABSTRACT

An improved optical collection and transmission surface includes a plastic mold injection surface including staggered multiple transmission sites each with a recessed portion in which incident light is not lost during reflection towards the propagation surface. A device implementing the surfaces is plastic-mold injected of high quality acrylic at in a preferred embodiment and can be economically optionally polished or finished to achieve desired quality surfaces.

19 Claims, 10 Drawing Sheets

REDUCED-FOOTPRINT ILLUMINATION SYSTEM USING HIGHLY-EFFICIENT OPTICAL COLLECTION AND REFLECTION SURFACE(S) AND METHOD FOR MANUFACTURING OPTICAL ELEMENTS USED THEREIN

REFERENCE TO PRIORITY DOCUMENTS

This Application claims priority under 35 USC §120 to and is a continuation-in-part of U.S. application Ser. No. 10/978,829, entitled "Reduced-footprint night illumination laser system" filed Oct. 29, 2004 now U.S. Pat. No. 7,186,006, which is incorporated by reference for all purposes. U.S. application Ser. No. 10/978,829 claims priority under 35 USC §119(e) to U.S. Provisional Application Ser. No. 60/522,525, filed Oct. 8, 2004.

BACKGROUND

U.S. Pat. No. 6,422,713, incorporated by reference for all purposes, and currently owned by Ford Global Technologies, and illustrated by FIGS. 1A and 1B shown that a collimator lens is used in conjunction with a laser diode for automotive illumination purposes. The problem with this collimator lens is two-fold: first, the current teaching means that the incident light transmitted by the reflecting surface is lost in the illustrated zones where the lens turns to creating the reflecting angle (45 degrees as illustrated), reducing the efficiency of light collection. This is illustrated in FIG. 1C. Furthermore, in order to create an efficient transmission, the lens must be "polished" in order to create an efficient transmission lens. This polishing can partially destroy the surface of the lens, which means that the lens becomes unusable, or a reduced amount of polishing can occur. Either problem results in higher cost and/or reduced efficiency.

BRIEF DESCRIPTION OF THE DRAWINGS

The invention(s) can be better understood by references to the following exemplary illustrations in which.

DETAILED DESCRIPTION OF THE DRAWINGS

Figures 1A, 1B:
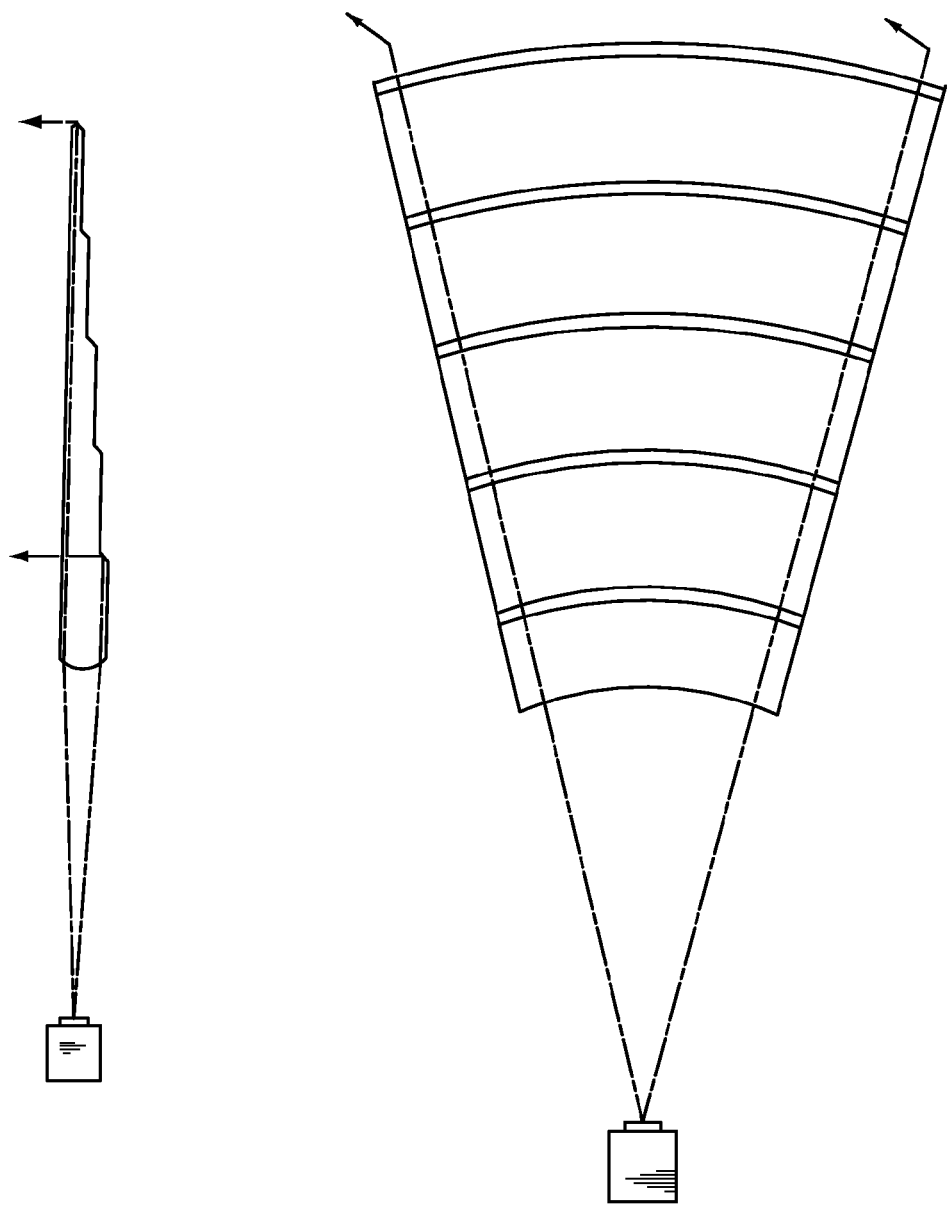
FIGS. 1A and 1B illustrate the prior art collimator lens.
Figure 1C:
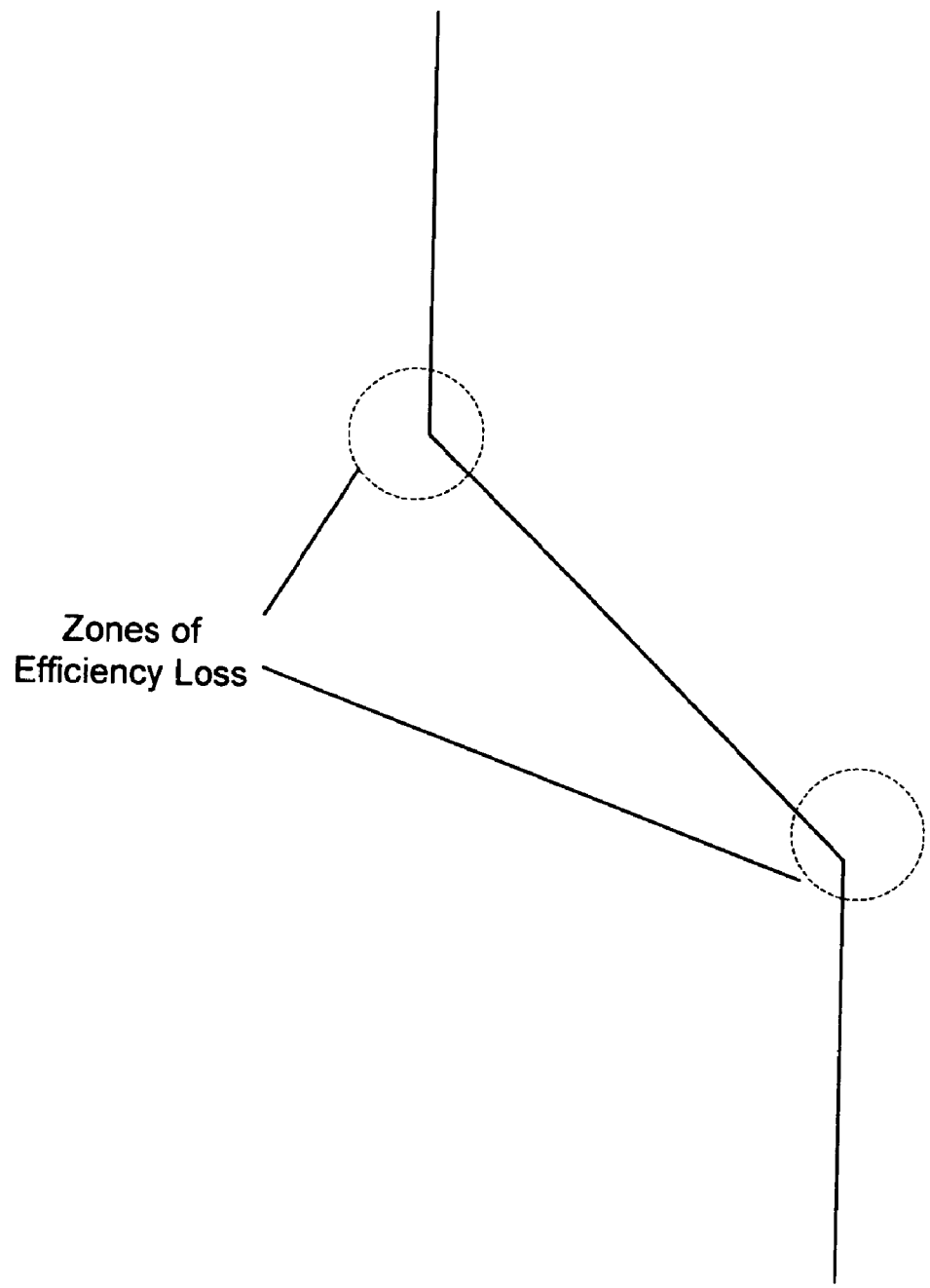
FIG. 1C illustrates the problem of the loss of transmitted radiation (light) in the prior art.
Figure 2:
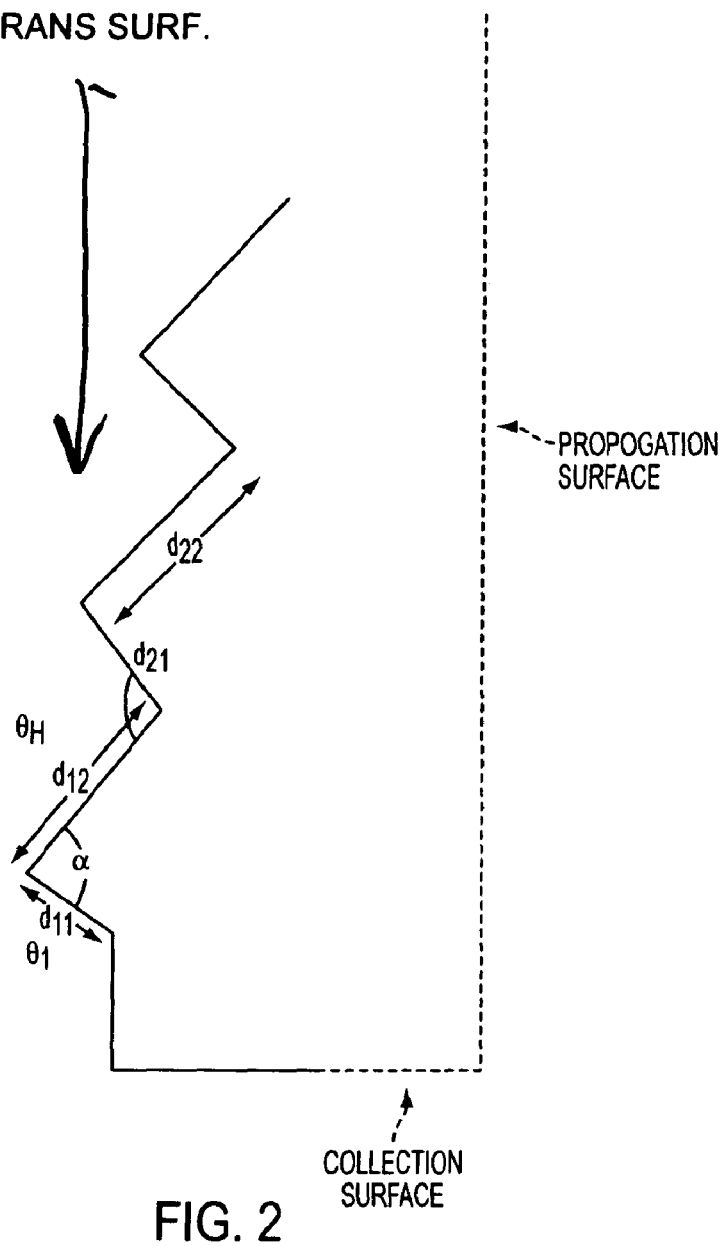
FIG. 2 illustrates a cutaway view of a sample transmission surface in a first embodiment of the invention.

FIG. 2 illustrates a sample of the invention in a first embodiment in which the cutaway view of the improved collimation system is shown. Light or other types of radiation (coherent or divergent) is "collected" at the collection surface (marked) and passed through a series of reflection/transmission areas which comprised the transmission surface (marked) and passes out the projection surface (marked). The transmission surface include a series of transmission areas each of which include a protrusion section (shown as d11) at angle Θ1 out from the direction of the radiation which then turns "inward" (towards the projection surface) at angle ω1 and a reflection surface d12, which protrudes into the interior, past the point (p(i1)) at which (in the y− direction) d11 started to move "outward."

Figure 3:
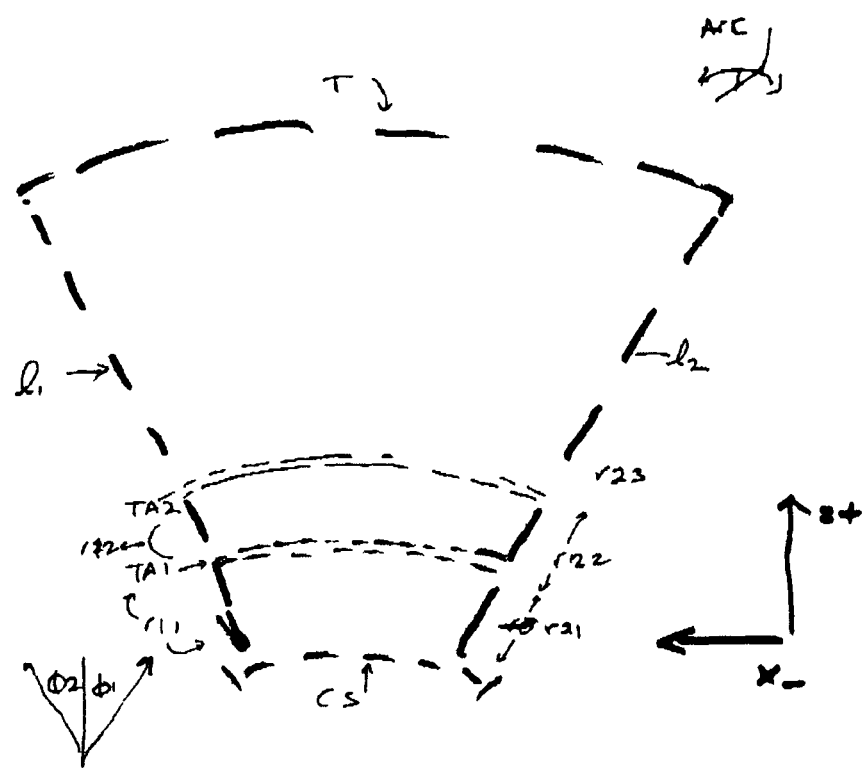
FIG. 3 illustrates a rear view of the transmission surface.

The inventive transmission surface may be implemented in a number of ways depending on the intended end use of the device. However, a first embodiment, as shown in FIGS. 2 and 3, is a collimation lens for illumination use. Therefore, additional transmission areas are configured along the transmission surface moving in the y+ direction towards the "top" T of the collimator. The transmission areas are marked a combination of the two (or more in alternate embodiments) "sides" (d21)+(d22) and angles Θ2, ω2, increasing by index number in the z+ or "upward" direction (e.g. d31, d32, Θ3, ω3, etc.). As can be appreciated by those skilled in the art, the transmission surface does not need to be entirely comprised of transmission areas, but can be configured to maximize transmission to the propagation surface as shown in the drawings.

The FIG. 3 is a "front" view of the transmission surface. Successive transmission areas ta1, ta2, ... are shown running in an horizontal arc (in the x+/− direction, which also rise and fall in the z+/− direction as well) along the length (l1 and l2) of the collimator lens to the top T which also may be configured in an arc. The angles a which each side (l1, l2) are from the z axis are shown by angles φ1 in the x+ direction and φ2 in the x− direction. In the shown embodiment, the two angles and sides are respectively the same, but do not need to be. The distance between each transmission zone ta1, ta2, ... is shown as r11, r12, ... along side l1 and r21, r22, ... along side l2. The collection surface CS is discussed in U.S. Pat. No. 6,422,713 which is incorporated by reference and will not be discussed further for the sake of economy.

Figure 5:
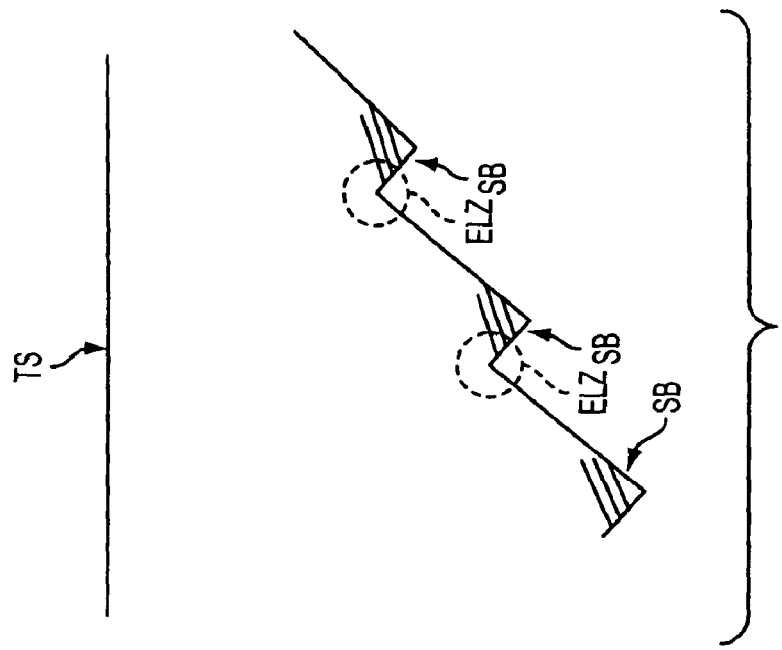
FIG. 5 illustrates the cumulative effect of multiple improved transmission points.
Figure 4:
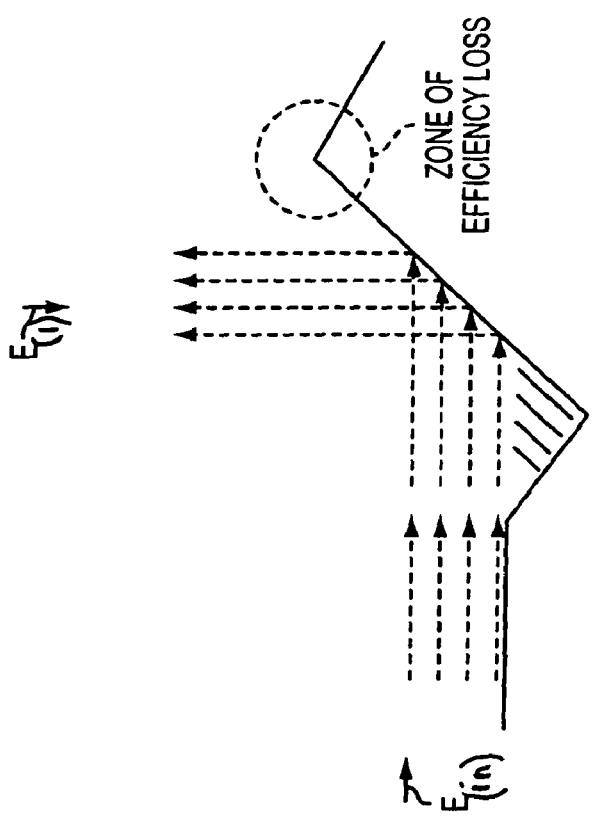
FIG. 4 illustrates the improved radiation transmission at a single reflecting facet.

Referring now to FIG. 5, a diagram of the electromagnetic energy transmission in the improved lens is shown. Electromagnetic energy, generally in the form of infrared light and shown by the dashed arrows, moves along the z axis in the positive direction. In most embodiments, the (incident) light will enter the collimator at the collection surface CS, discussed above and be reflected towards the propagation surface (see FIG. 2A). Although the light energy will be lost at the single zone of efficiency loss (marked), the recessed portion SB will prevent the light energy from loss at more than one transition point per transition area (see FIGS. 2 and 3). Efficiency loss in these zone, is generally due to several factors, but is generally related to limitations in the manufacturing and finishing process(es) of materials that are economical enough to make the end-use device practical, as well as due to optical constraints.

The improved transmission surface is apparent in FIG. 5 in which we see how many zone of efficiency loss ELZ are eliminated along multiple transmission areas and replaced with the recessed portions SB which also protect the transmission surface during the manufacturing and finishing process.

Although a first embodiment of the invention is for manufacturing "collimation devices" for use in illuminations systems, it is contemplated that the improvements in energy transmission surfaces and reduced cost of manufacturing will also provide valuable in the manufacture of the other systems.

Figure 6:
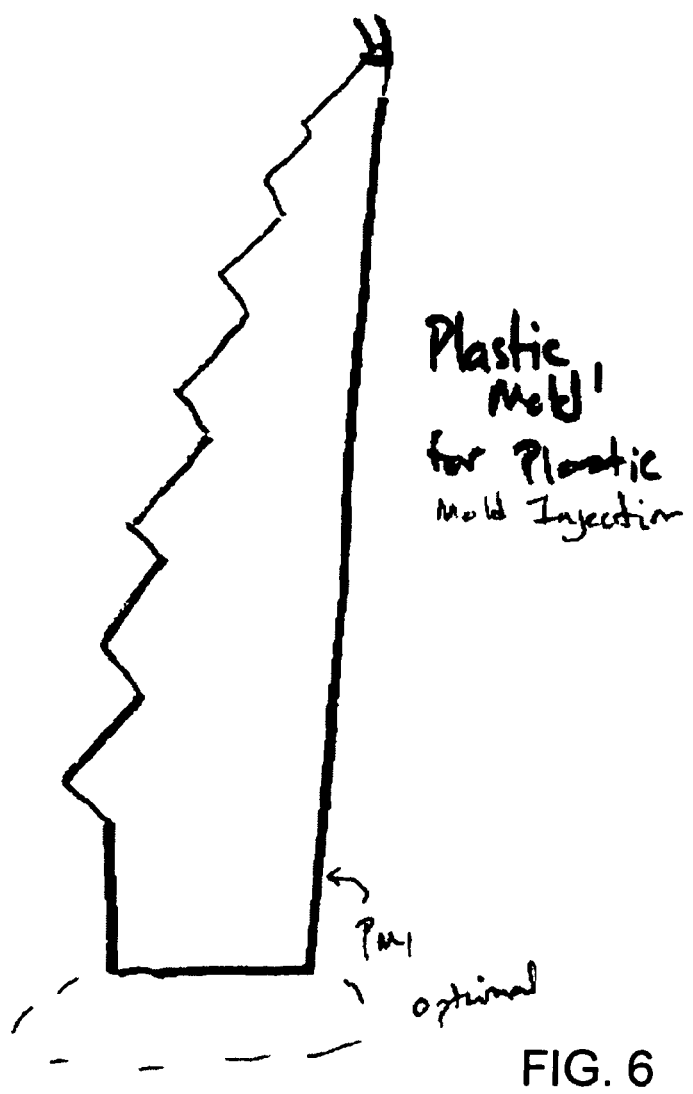
FIG. 6 illustrates a plastic mold for making the improved surface in a plastic mold injection embodiment of the invention.

Referring now to FIG. 6, a preferred embodiment of the invention is shown as a mold for plastic mold injection of devices that implement the improved collection and transmission surface of the present invention. In particular, the plastic mold injection with the extended angle and protrusion ($\Theta 1$, $\Theta 2$, ...) serves to protect the efficiency of the transmission surface during polishing. This improvement allows for two distinct advantages of the present invention over the existing art. First, devices implementing the enhanced transmission surface allows for the implementation of an easier plastic mold injection process and secondly, the polishing or finishing of the end-use collimators or other devices can be implemented more cheaply and include a more thorough polishing method due to the durable surface. Even in the event of over polishing, the loss of a plastic molded collimator with the improved transmission surface will be on the order of a few dollars due to the inexpensive materials and manufacturing techniques.

The materials used for the manufacture of the present invention are generally inexpensive clear polymers, which is generally acrylic, but may vary depending on the intended end use of the device implementing the improved transmission surface.

Discussion of the choice and implementation of the appropriate materials for the present invention is included in the series *Speaking of Plastics Manufacturing* by Bill Fry and published by the Society of Manufacturing Engineers (1999), which are incorporated by reference herein, specially the titles: "working with acrylic," "working with vinyl," and "working with polyethylene." Also useful for choosing and implementing the appropriate materials and specific plastic injection mold manufacturing techniques is the *Handbook of Plastics, Elastomers and Composites*, 4*th ed*., by Charles A. Harper (McGraw-Hill 2002), which is also incorporated by reference herein.

In another aspect of the invention provides for a portable illumination device with a reduced footprint size. Particular embodiments of the invention are useful in illumination in conjunction with many night-vision technologies or other applicable areas, such as surveillance, search and rescue, robot vision, machine vision, etc. Laser diodes are an excellent source of illumination and can provide radiation for a variety of different spectrums, particularly infrared. Unfortunately, the laser diodes produce a very tight beam of light, which essentially over-illuminates a very small area, as well as creates damage to the human eye.

The illuminator embodiment of the present invention diffuses the laser diode light beam so that a much larger area can be thoroughly illuminated than would otherwise be possible with laser diode illumination sources. The spreading of the light beam is controlled by a variety of diffusers and lenses, and can be adjusted according to the needs of the user. However, the size of the laser light diffuser is reduced in comparison to that of the prior art. The reduction is partly accomplished by redirecting the light beam source back over itself as it is being diffused.

Figure 7:
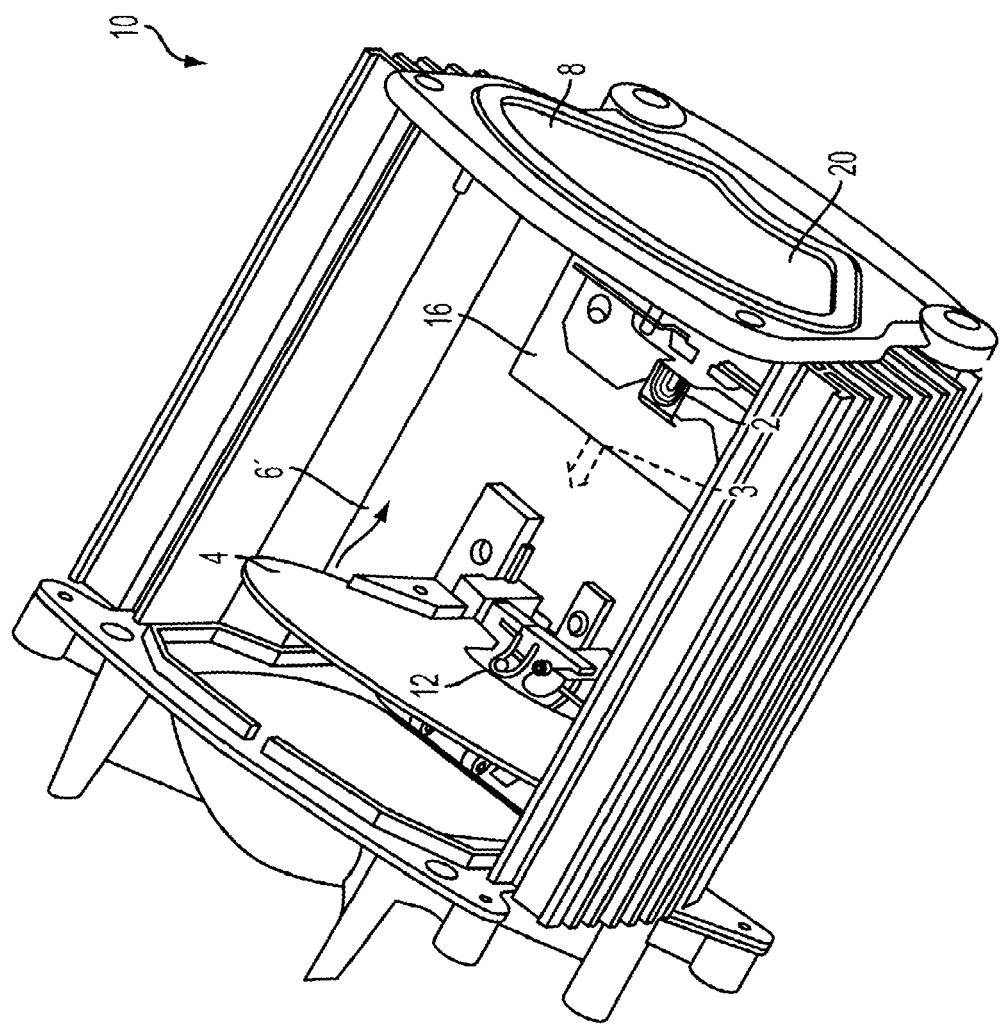
FIG. 7 illustrates one embodiment of a light diffuser unit using the collimator lens, according to one embodiment of the present invention.

Referring to FIG. 7 one embodiment of a portable laser diode light diffuser is shown. The light diffuser unit illustrated comprises a laser diode source 2 that projects light into a collimator lens 4, as discussed above in FIGS. 2-6. In this manner, a single beam of high intensity light is transformed into a plane of projected light 6. The plane of projected light 6 passes out of the light diffuser unit, usually though a diffuser screen 8 to illuminate an area.

The laser diode 2 may be of a variety of types, such as an Osram™ diode. In some embodiments, the light from the diode is non-collimating, but can also be divergent in particular embodiments. Typical diodes project light as a tight rectangle. A non-collimating diode projects light as an expanding rectangle. The dimensions of the rectangle will vary depending on application, as well as on the internal geometries of the light diffusion unit. In particular embodiments, the wavelength of the light produced by the diode does not change by being diffused by the light diffusion unit.

In the embodiment illustrated in FIG. 7, a single laser diode 2 is used. In other embodiments, a plurality of laser diodes can be used in close conjunction with one another. The plurality of laser diodes may be of the same frequency, to produce a stronger projected light, or they may be of a variety of frequencies so that a diffuse light with a greater frequency range is produced.

In addition to the above, particular embodiments allow specific color effects to be accomplished. These color effects may be accomplished by a second type of laser diode, or may be accomplished by flooding the unit with another type of light external to the illustrated light path. For example, in the 808 nm range discussed below, the light diffusion unit will illuminate an area with invisible light, however, a small amount of red spectrum visible light will also be produced. Since red lights have particular meanings in many industries, it may not be desirable to have the light diffusion unit shine red. A second visible light source can be added almost anywhere within the light diffusion unit. For instance, green floods out the red glow, creating an 808 nm invisible light source that also appears to shine green. Of course the second light source, unless emitted from a diode and forced through the illustrated pathway, will not illuminate in the same manner as the first.

Alternately, the plurality of laser diodes can be pulsed so that diodes of the same frequency can produce a continuous stream of plane projected light, or at least continuous enough to the human eye or equipment monitoring the light diffuser unit. In this embodiment, the pulsing of the diodes reduces their heat output and also increases the life expectancy of the diodes. It is also possible that a light diffuser unit can function at a variety of different states, such that if a stronger light source is required, multiple diodes turn on simultaneously, while a more heat/energy/life conservative mode can be used in default that pulses the diodes. Additionally, the rate of pulse between the diodes can be changed depending on what is using the light diffuser as a light source. For instance, a camera outfitted with the appropriate filters and lenses for recording the illuminated area, might require more or less pulses of light to function optimally (similar to certain machine vision technologies) than the human eye looking through goggles.

Efficiency, as used herein, refers to the total intensity of the light as emitted from the laser diode to the total intensity of the light emitted from light diffusion unit. For example, it is preferable if the collimator lens reduces the efficiency of the system by approximately 15% or less. As is known in the art, high-efficiency collimators can be made of expensive materials that are labor intensive to produce, but that can increase efficiency.

As the projected planar light 6 leaves the casing 10, it passes through a diffusion screen 8. The diffusion scatters the light over a broader area, and preferably spreads the light in an even manner, although in some applications, an uneven spreading of the light may be desirable. One type of filter, known as a holographic diffuser, generally acts in a non-linear manner (generally as a Fourier transform) and spreads the light in a uniform way or other intended pattern (depending on the Fourier patter) without changing its frequency and without a large impact on the net illumination. Holographic diffusers are generally in the form of a thin polycarbonate film or screen, supplied by POC™ of Torrance, Calif. The specifications regarding these holographic diffusion systems are available from POC, at their Internet site http://www.poc.com and included are both "standard" (off the shelf) and "custom" solutions from the aforementioned company. In addition to spreading the light evenly or not, exactly how the light is spread can vary depending on the application and the needs of the end user. Essentially, a wider area of illumination can be spread in exchange for illumination distance and vice versa. A particular range of spread would be 10-degree vertically, both up and down, and 20-degree horizontally, to both sides, but will vary depending of the needs of the end user. For example, robot vision for search and rescue will require a different range than a camera recording night surveillance photos.

A holographic diffuser will reduce the overall efficiency of the light diffuser unit by 5-8%. Therefore optimizing the spread of the light with fewer light diffusers is preferable. However, as given in an embodiment below, sometimes additional light diffusers are added to improve the light spread so that the overall efficiency is optimized and/or the desirable non-linear transform of the light plane emanates from the system. Other components that reduce efficiency but improve the system as a whole may also be used. For example, putting a protective lens, such as a glass or acrylic lens, over the end of the unit may reduce efficiency by about 2-5%, but will provide protection for the diffusion screen and internal components, and may be part of the end-user's needs, such as manufacturing costs (plastic mold injection, snap-on, etc.). A plastic-mold injection system that can incorporate the holographic diffuser system because of its polycarbonate properties with a tough acrylic lens that can snap into the rigid body is particularly efficient for cost reduction and reduced manufacturing error.

In this embodiment the casing 10 of the light diffuser is made with rigid, thermally conducting (and preferably) light weight materials, such as, but not limited to, aluminum. The purpose of the casing 10 is two fold. It provides protection to the instruments within and it diffuses heat (heat sink). Although the collimator lens 4 and mirrors 12 can be themselves made with a variety of materials, ranging from very fragile to relatively non-fragile, it is still preferred that they not be exposed to impact damage. The surfaces of the collimator lens 4 and mirrors 12 further need to be kept as clean and clear as possible, so that the casing 10 is air tight, and in some embodiments filled with gasses that do not scatter the projected light 6. To aid in the diffusion of heat, the casing 10, as illustrated in FIG. 7, has a plurality of fins that further aid in the diffusion of heat without adding significant weight.

The casing itself can be a closed system, in that it can be an air tight unit. This would prevent dust and other materials from collecting on the internal surfaces. However, a particular embodiment allows for the flow of air into the unit while filtering dust particles. Gortex™ seals are an example of a passive air filter that does not allow in particle contaminants or water.

The heat produced from the laser diode can further be dissipated in a number of different ways. One such way is to place the diode on a heat sink 16, such as a copper block, which may include up to 100 percent copper (which is preferably not machined directly). Although heat sinks will increase the weight of the light diffuser unit, there is a trade off between weight and heat diffusion. This trade-off is also dependent on the use of the light diffuser unit. Hand-held models will optimally include a heat sink, while those mounted on machinery could do without. The addition of a heat sink also limits the infrared light pollution that might otherwise contaminate the projected light 6 in some applications.

The heat sink itself might have an interface between itself and/or the diode and the casing. For example, indium foil can be placed between the diode and a copper block to improve dissipation. Also, other materials such as Wakefield Thermal Compound heat conductive grease can be used between the heat sink and the casing. Fans, both internal and external can also be used. An internal fan would optimally blow on or near the laser diode, while an external fan would supply air to the internal space. In addition, thermal electric coolers or TE coolers can be used to move heat from the heat sink to the external housing for greater heat transfer.

In the embodiment shown in FIG. 7, a mirror 12 reflects the laser diode light to the collimator lens 4 (discussed above in FIGS. 2-6). To make a light diffusion unit effective, the light emitted from the laser diode 2 needs to travel a certain distance before contacting the collimator lens 4. By reflecting the light in a mirror, the light is able to travel the required distance, but the space required in the light diffusion unit is essentially halved. This allows for the size of the light diffusing unit to be greatly reduced. In FIG. 7, the light from the diode travels approximately 2-3 inches (5-7.5 cm) to the mirror and then a short distance to the collimator lens. The use of a mirror in this manner will reduce the overall efficiency by approximately 1% to 5% or even less depending on the quality of the mirror.

The angles of the mirror in relation to the diode can be adjusted depending on what angle the diode is in relation to the collimator lens originally. In the embodiments illustrated, the light from the diode is changed by a 90-degree angle before contacting the collimator lens. Without the mirror, the laser diode needs to hit the collimator lens directly from below, however, the diode cannot be positioned too close to the lens. This is because the light from the diode needs to travel a certain distance so that proper spread is achieved. Also, the heat from the diode may damage some types of lenses.

In the embodiments shown, the light beam produced by a laser diode is passed back over itself as it is being diffused. The figures therefore have a sense of "up" for clarity. It would be apparent to one of ordinary skill in the art, however, that the configurations shown can be rotated at almost any angle to produce the same result. In fact, in some embodiments, it may be desirable to have the layout rotated 90.degree. or 180.degree. so that heat produced by the diode interferes less with the with the projected planar light. Therefore, in referring to the planar light passing "over" the concentrated light beam, this can be equally interpreted as "under," "beside," etc.

Figure 8A:
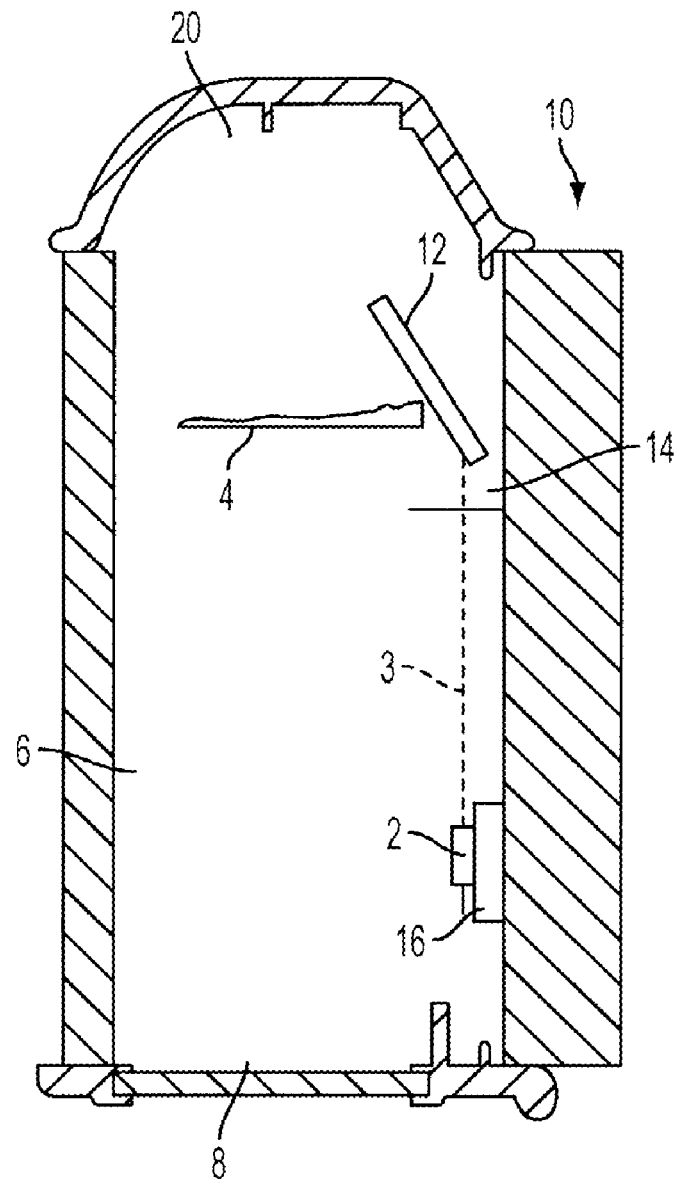
FIGS. 8A and 8B illustrate a side and top cutaway view of a light diffuser unit using the collimator lens according to one embodiment of the present invention implementing the improved collimator.
Figure 8B:
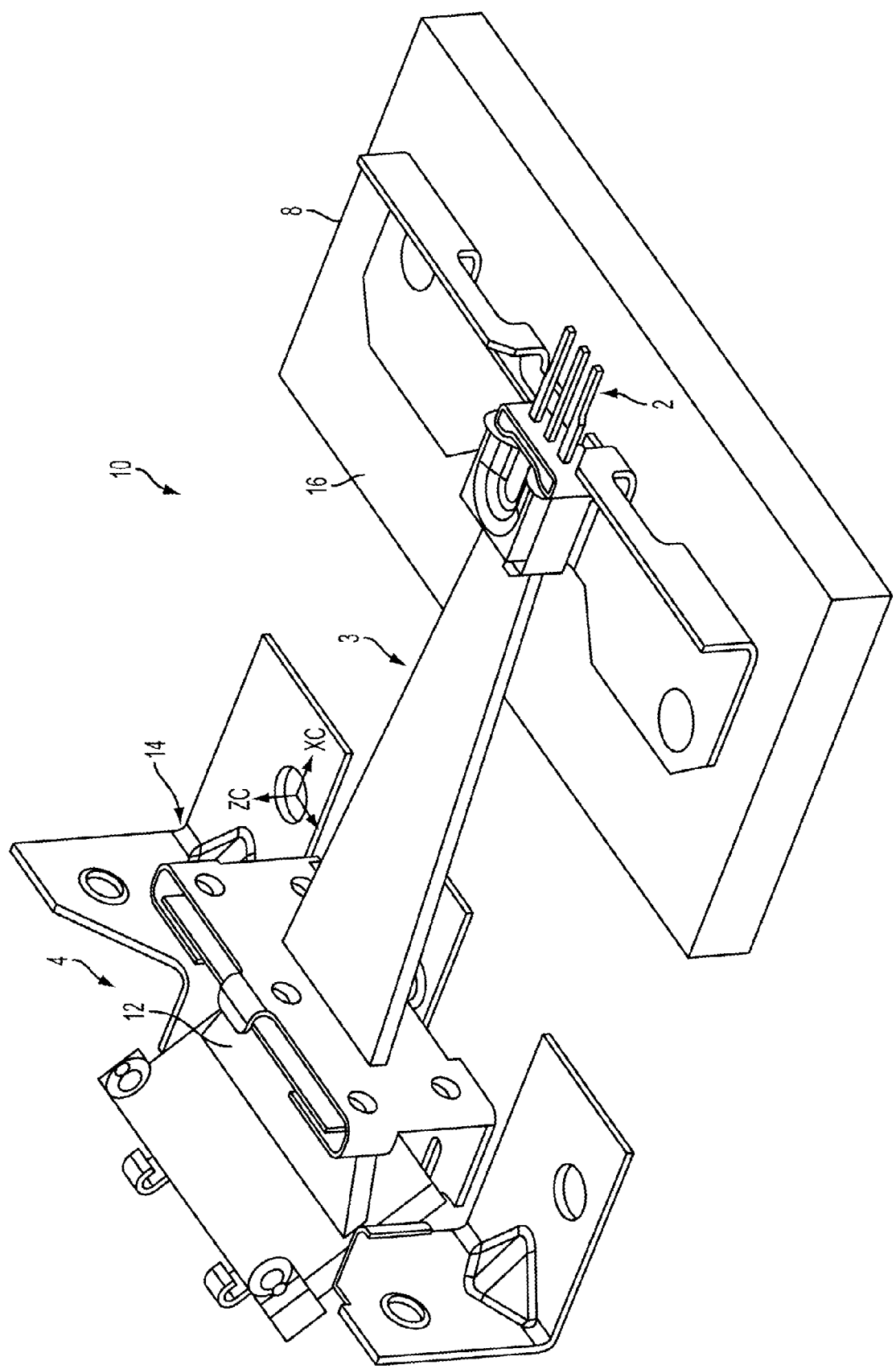

Referring to FIGS. 8A and 8B, the light path is illustrated from a side view as well as from above. One or more laser diodes 2 provide a concentrated beam of light 3 that reflects 90.degree. in a mirror 12 to the base of the above-discussed collimator lens 4. The concentrated beam of light 3 is naturally a tight beam as it emerges from the diode; however, some diodes produce a slightly rectangular beam, which aids in the diffusion.

To further aid in diffusion, in particular embodiments, the light may first pass through a first holographic diffusing film 14 which properly spreads the emitting light, generally through a non-linear (usually Fourier) transform. Although passing the light through additional mediums or multiple diffusers reduces overall light efficiency, at this stage it is more desirable to fill the base of the collimator lens. If the concentrated beam of light is produced from a non-collimating laser diode, then this step may not be necessary.

The concentrated beam of light 3 reflects in the mirror 90.degree. to then strike the base of the collimator lens. The position of the laser diode 2 to the mirror 12 can vary depending on the type of diode used, but is approximately 2-3 inches (5-7.5 cm). Also, in FIGS. 6A and 6B, the laser diode is positioned straight at the mirror. However, if multiple laser diodes are being used, the diodes would need to be staggered so that the light strikes the mirror at an angle. The change in the light angle after striking the mirror would still be 90.degree. with respect to the vertical, but there would also be a slight shift in regards to the horizontal as well so that the concentrated beam of light strikes the collimator lens at about the center of its base.

Once the concentrated beam of light 3 strikes the base of the collimator lens 4, the light is diffused into a plane of light 6 at a 90.degree. from which it was received. The plane of light 6, also referred to as projected planar light, is described as such since photons traveling in it are traveling in the same direction and are fairly evenly distributed.

The plane of light 6 is then spread by a diffusion screen 8. The diffusion screen in most embodiments spreads the light in a uniform manner, though horizontal spreading may be favored over vertical spreading for certain applications and vice versa, as described above.

In the embodiments illustrated, there is shown a concave section 20 towards the back of the casing 10. This is a preferred location for objects such as a fan or monitoring equipment.

The dimensions of a portable light diffusion unit can vary, but in one embodiment the external casing is approximately 6 inches (15 cm) long, 3.0 inches (7.5 cm) wide and 3.5 inches (8.75 cm) high. Similarly, the weight of the unit can vary, but in the embodiments illustrated is approximately 2 pounds (0.9 kg), with approximately 6 ounces (0.17 kg) of that weight being the heat sink.

In the applications thus described, the invention has been applicable to any type of light. However, particular embodiments of the invention are used in conjunction with night vision technologies. Light in the range of approximately 800 to 950 nm is particularly useful for this application, though other ranges can also be used. For instance, 808 nm wavelength light is essentially invisible, although a dull red glow may still be seen. 915 nm wavelength light is even more invisible to the human eye. However, night vision equipment, such as a Watch™. CCD black and white camera, reads light at the 808 nm range better than the 915 nm range. So, at the 808 nm range less power is required, since a less intense beam at the 808 nm can be observed with the night vision equipment better than an equivalently powered beam at 915 nm. Therefore, the wavelength can be varied depending on the corresponding night vision equipment. Some light diffusion units may even have multiple wavelength applications. Other wavelengths may be desirable in trying to make the light invisible to different types of animals for nighttime zoological studies.

The intensity of invisible light is measured in watts, which is directly a result of the power intensity of the laser diode being used. For example, an 808 nm laser diode that is powered at 10 to 20 watts will produce, at 65% efficiency, a 6.5 to 13 watts diffuse light. Diodes of 7-20 watts and even greater, will typically be used with the present invention, although different intensity diodes can also be used. As the technological development of laser diodes increases, it is expected that upper watt ranges of the present invention will also increase or may also be reduced in (downward) scalable embodiments of the invention.

Figure 9:
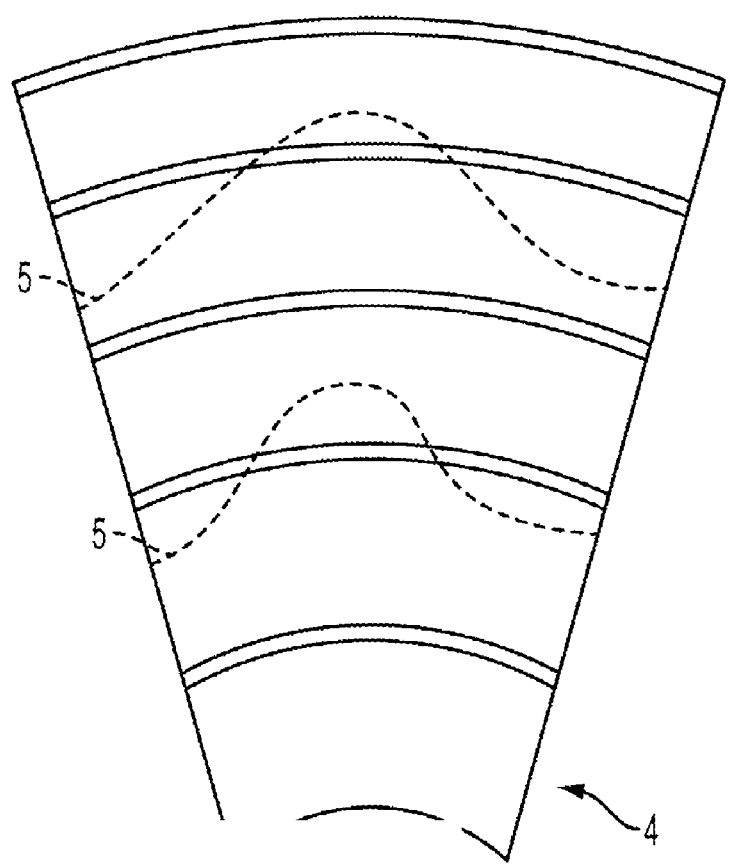
FIG. 9 illustrates a typical distribution of the intensity of planar light emitted from any collimator lens.

Referring to FIG. 9, a typical distribution of the intensity of planar light emitted from a collimator lens 4 is shown. This is a front on view of an embodiment of a collimator lens 4 showing that although the planar light is described above as substantially evenly distributed, areas of intensity are often still present. The planar light will be more intense towards the base of the collimator lens, with a gradual decrease in intensity moving up the lens. Although the intensity change is not abrupt, it does tend to resemble a Gaussian curve 5, or a double Gaussian curve if two light sources are being used.

Although the present invention is described as illuminating an area in front of the light source, whether with visible or invisible light, like any strong light source area, the sides and even behind the light source become illuminated as the light reflects off of the surfaces.

In one embodiment, the present invention provides for a portable laser diode light diffuser that comprises a casing, where the casing is comprised of rigid, thermally conductive materials and one or more laser diode light source. One or more of the laser diode light sources emits a concentrated beam of light at a predetermined wavelength. A mirror reflects the concentrated beam of light from the laser diode into a collimator lens. The collimator receives the concentrated beam of light and projects the concentrated beam of light into a plane of light and then into a diffusion screen, where the diffusion screen spreads the plane of light a predetermined amount. The portable laser diode light diffuser illuminates an area in front of the portable laser diode light diffuser. The efficiency of the portable laser diode light diffuser is approximately 65%. Also, the path of the plane of light passes over and in an opposite direction to the concentrated beam of light.

In a related embodiment, the mirror is positioned approximately 3 inches (7.5 cm) from the laser diode light source. The casing is composed of aluminum and may have fins to aid in thermal conductivity and also a controlled air intake. The diffusion screen is a holographic diffusion screen. The diffusion screen spreads the plane of light, such as 10.degree. up and down and 20.degree. side to side. However, it can be appreciated that positions and spreads may be adjustable and dimensions scalable, depending on the end uses and the energy requirements of the device. In still another embodiment, the casing is approximately 6 inches (15 cm) long, 3.0 inches (7.5 cm) wide and 3.5 inches (8.75 cm) high and weighs approximately 2 pounds (0.9 kg) using a laser diode of 7-20 watt strength.

In another related embodiment, the predetermined wavelength is invisible to the human eye, such as 800-950 nm. In another embodiment, an additional light source is present within the casing to flood visible light produced by the laser diode.

In one embodiment, the diode is mounted to a heat sink, such as copper, which may include up to 100 percent copper that also may be non-machined.

In some embodiments, multiple laser diodes are used. These laser diodes may pulse at different times, providing a continuous stream of light to the collimator lens, or they may be activated together to provide an enhanced beam of light to the collimator lens. The laser diodes may all be of the same wavelength or they may have different wavelengths.

In another embodiment, the present invention provides for a laser diode light diffusion unit that comprises a laser diode, a mirror and a collimator lens. The laser diode produces a concentrated beam of light that reflects in the mirror into the base of the collimator lens, where the collimator lens converts the concentrated beam of light into a plane of light that is projected over and in an opposite direction to the path of the concentrated beam of light.

In still another embodiment the present invention provides for a laser diode light diffusion unit that comprises a casing with a lens cover that holds a laser diode mounted on a heat sink, a mirror, a collimator lens and a holographic diffusion screen. The casing is made of a rigid thermally conducting material, and the heat sink is mounted within the casing such that a concentrated beam of light produced by the laser diode is directed at the mirror. The concentrated beam of light directed at the mirror is reflected at approximately 90.degree. into the base of the collimator lens, where the collimator lens converts the concentrated beam of light into a plane of light that is projected over and in an opposite direction to the path of the concentrated beam of light. The plane of light then passes through the holographic diffusion screen, where the holographic diffusion screen spreads the plane of light at predetermined angles and then passes through the lens cover and out of the casing.

In the collimator embodiment, the invention is a plastic mold for plastic mold injection. The plastic mold includes a hollow space for a clear polymer material including a first flat smooth surface and a second surface opposite the first surface. The second surface includes at least one irregular V-shaped surface connected to a vertical or nearly vertical surface at a first connection point. In this first connection point, a first linear portion of the V-shape moves away from the first surface at the connection at a first angle for a first distance. A second linear portion moves towards the first surface at a second angle for a second distance to a first transition point. In this way, such a transition point is closer to the first surface than the first connection point. The first angle is generally between 40 and 50 degrees from the vertical axis and is approximately 45 degrees from the vertical axis. The surface may include multiple irregular V-shaped surfaces connected at multiple transition points, and the first and second surfaces meet at a point and the second angles are between 40 and 50 degrees from the vertical axis. This first transition point is connected to a second vertical or nearly vertical portion. A second irregular V-shaped structure is connected to the second vertical portion at a second transition point. The plastic mold is configured to accept clear acrylic. In an alternate embodiment, multiples of the irregular V-shapes are connected to a successive transition point and configured such that the first and second surfaces meet at a point.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which, is to be given the full breadth of the claims appended and any and all equivalents thereof.

We claim:

1. An improved collimator made of a translucent material, including: an input surface for receiving radiation; an output surface generally perpendicular to said input surface for emitting said radiation; and a transmission surface; said transmission surface configured such that it includes at least two types of angles along a plane parallel to said output surface and generally perpendicular to said input surface, said transmission surface also including two surface lengths, said first type of angle extending away from both said input and output surfaces; said second type of angle extending towards said output surface but away from said input surface; said first type of surface length formed starting at the intersection of said first angle and said second angle and extending away from said output surface; said second type of surface length formed starting at the intersection of said second angle and said first angle and extending towards said output surface; said first and second types of angles and surface lengths forming a plurality of reflecting facets arranged so that said radiation is reflected only by said plurality of reflecting facets in passing from said input surface to said output surface.

2. The collimator as recited in claim 1, wherein said second type of surface length is longer than said first type of surface.

3. The collimator as recited in claim 2, wherein said transmission surface ends at said output surface and an end opposite to said input surface.

4. The collimator as recited in claim 2, wherein said second type of angle is between 110 and 160 degrees.

5. The collimator as recited in claim 4, wherein said second type of angle is between 125 and 145 degrees.

6. The collimator of claim 1, further including a third type of surface, formed by an angle extending away from said input and output surfaces at a surface approximately parallel to the output surface and a first angle, such that the transmission surface extends away from said output surface before it extends towards said output surface.

7. The collimator as recited in claim 1, wherein said translucent material is a polished acrylic.

8. A method for improving the performance and reducing the manufacturing cost of a high-performance optical element, said optical elements for transmitting radiation, including the acts of: forming a first side of said optical element; and a second side perpendicular to said side; forming a third side, said third side with reflecting facets that reflect said radiation said third side consisting essential of a series of alternating connecting acute and obtuse angles, said connecting acute and obtuse angles oriented opposite said second side; machine polishing all of said sides after formation, whereby said obtuse angles on said third side prevent the excessive degradation of the optical performance of said third side.

9. The method as recited in claim 8, further comprising the step of adding a base.

10. The method as recited in claim 8, wherein said formation is from a high-quality acrylic material.

11. A plastic mold for plastic mold injection of translucent material including: a hollow space for a clear polymer material, said hollow space including a first flat smooth surface and a second surface opposite said first surface, said second surface including at least one irregular V-shaped surface connected to a vertical or nearly vertical surface at a first connection point in which a first linear portion of said V-shape moves away from said first surface at said connection at a first angle for a first distance and a second linear portion which moves towards said first surface at a second angle for a second distance to a first transition point, such that said transition point is closer to said first surface than said first connection point, wherein multiple of said irregular V-shapes are connected to successive transition point and configured such that said first and second surfaces meet at a point.

12. The plastic mold as recited in claim 11, further including an end-use connection configuration in volumetric contact with at least said first or said second surfaces.

13. The plastic mold as recited in claim 12, wherein said connection is at least one cylindrical peg.

14. The plastic mold as recited in claim 13, wherein said mold is designed to be used with acrylic.

15. A plastic mold injection mold for use with a clear polymer: a first surface; a second surface relatively perpendicular to said first surface, that includes multiple zig-zags, said zig-zags consisting of two uneven length sides wherein said first longer edge forms the portion of the zig-zag furthest away from said first surface, configured such that the angles formed by the longest edge of each of said zig-zags and the perpendicular to said first surface is between 125 and 145 degrees, rotating inward and the angle formed between the shortest edge of each of said zig-zags and the perpendicular to said first surface is between is between 95 and 135 degrees, rotating outward; and a smooth flat surface opposite said surface with zig-zags.

16. The mold as recited in claim 15, wherein said mold is configured for use with acrylic.

17. The mold as recited in claim 16, further including a hollow space for a mounting structure that is volumetrically in contact with said first edge.

18. The mold as recited in claim 17, wherein said mounting structure is configured to be in volumetric contact perpendicular to said second surface.

19. The mold as recited in claim 17, wherein said mounting structure is configured to be in volumetric contact perpendicular to said first surface.

* * * * *